US012738087B2

(12) United States Patent
Pearce et al.

(10) Patent No.: US 12,738,087 B2
(45) Date of Patent: Sep. 15, 2026

(54) HUMAN POSTURE DETECTION

(71) Applicant: REALSENSE, INC., Santa Clara, CA (US)

(72) Inventors: David Pearce, El Dorado Hills, CA (US); David Stanhill, Hoshaya (IL)

(73) Assignee: REALSENSE, INC.

( * ) Notice: Subject to any disclaimer, the term of this patent is extended or adjusted under 35 U.S.C. 154(b) by 0 days.

(21) Appl. No.: 18/064,519

(22) Filed: Dec. 12, 2022

(65) Prior Publication Data

US 2024/0193981 A1 Jun. 13, 2024

(51) Int. Cl.
*G06V 10/82* (2022.01)
*G06V 40/10* (2022.01)
*G06V 40/60* (2022.01)

(52) U.S. Cl.
CPC ............ *G06V 40/103* (2022.01); *G06V 10/82* (2022.01); *G06V 40/60* (2022.01)

(58) Field of Classification Search
None
See application file for complete search history.

(56) References Cited

U.S. PATENT DOCUMENTS

| | | | | |
|---|---|---|---|---|
| 9,247,225 | B2 | 1/2016 | Yehezkel et al. | |
| 2012/0056988 | A1 | 3/2012 | Stanhill et al. | |
| 2014/0267701 | A1 | 9/2014 | Aviv et al. | |
| 2016/0086088 | A1 | 3/2016 | Yehezkel et al. | |
| 2016/0180722 | A1 | 6/2016 | Yehezkel et al. | |
| 2016/0307032 | A1* | 10/2016 | Butler | G06V 10/70 |
| 2017/0345165 | A1 | 11/2017 | Stanhill et al. | |
| 2020/0034986 | A1* | 1/2020 | Kirmani | G06V 40/28 |
| 2022/0036050 | A1* | 2/2022 | Chandler | G06V 40/28 |
| 2022/0207770 | A1* | 6/2022 | Liu | G06T 17/20 |
| 2022/0296966 | A1* | 9/2022 | Asikainen | G16H 20/30 |

OTHER PUBLICATIONS

Ami S Mohamed et al. "An Evaluation of RGB and LiDAR Fusion for Semantic Segmentation", Machine Learning for Autonomous Driving Workshop at the 34th Conference on Neural Information Processing Systems (NeurIPS 2020), Vancouver, Canada; 8 pages.

Khaled El Madawy et al. "RGB and LiDAR fusion based 3D Semantic Segmentation for Autonomous Driving", IEEE Intelligent Transportation Systems Conference (ITSC) 2019; 7 pages.

* cited by examiner

*Primary Examiner* — Idowu O Osifade
(74) *Attorney, Agent, or Firm* — S.J. INTELLECTUAL PROPERTY LTD.

(57) ABSTRACT

A user computing device includes a camera sensor and a depth sensor. Image data generated by the camera captures an image of a user of the user computing device and is provided as an input to a first machine learning model trained to determine a feature set associated with posture of the user from the image data. Depth data generated by the depth sensor contemporaneously with generation of the image data is provided as input to a second machine learning model along with the first feature set to generate a second feature set as an output of the second machine learning model based on the depth data and the first feature set. The posture of the user is determined from the second feature set to provide feedback to the user.

21 Claims, 10 Drawing Sheets

310

325

305

500

HUMAN POSTURE DETECTION

TECHNICAL FIELD

This disclosure relates in general to the field of computer systems and, more particularly, to visual computing.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general-purpose computer are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. As humans spend more and more of their time working with and consuming content using computing systems, concern has developed over how such use impacts human health and well-being. For instance, the impact of extensive use of computing systems on human ergonomics has emerged as a concern within institutions whose employees, customers, and user bases may be using computing systems in a manner that could have a negative impact on their health.

BRIEF DESCRIPTION OF THE DRAWINGS

Like reference numbers and designations in the various drawings indicate like elements.

DETAILED DESCRIPTION OF EXAMPLE EMBODIMENTS

Over the past century, the work and recreation of human beings has become increasingly tethered to computers, electronics, and displays, including personal computers, televisions, and video games. An unintended consequence of this evolution toward activities where users sit and view displays for extended (and increasing) lengths of time are a similarly increasing array of health maladies, many of which are connected to poor ergonomics, posture, and extended sitting, including obesity, muscular skeletal disabilities, heart disease, and others. While a variety of desks, chairs, computer stands, keyboards, and other tools have been developed to help improve ergonomic environments for humans using user computing devices, an inherent weakness of such devices is that while humans engross themselves in work, video content, a video games, etc. using the user computer, the user loses focus on using the computer or chair or desk or keyboard correctly or consistently and may still relapse into a bad posture, positioning, or other habit that may ultimately be detrimental to the user's health, among other example issues.

Figure 1A:
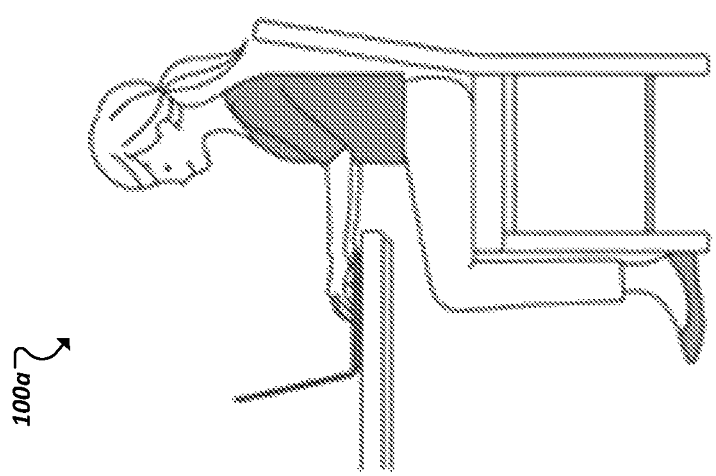
FIGS. 1A-1C are diagrams illustrating example posture of a human user using a user computing device.
Figure 1B:
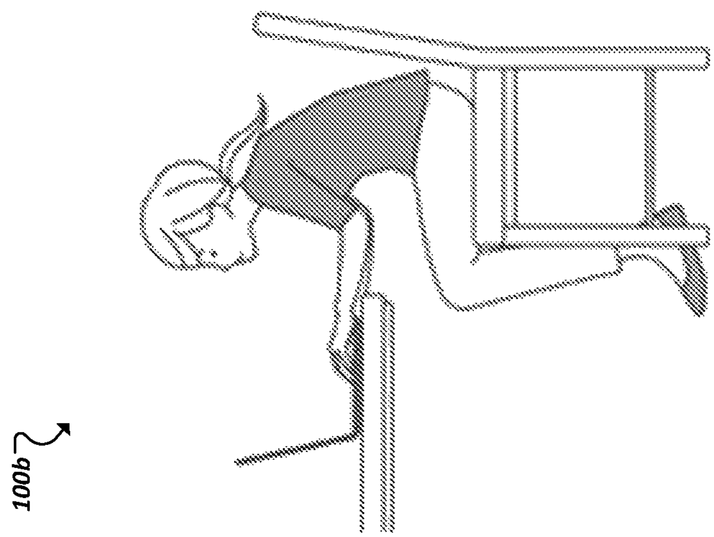
Figure 1C:
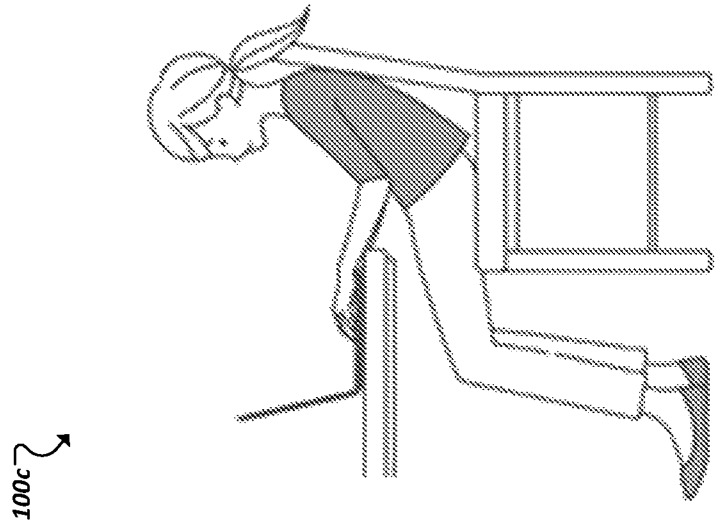

FIGS. 1A-1C are illustrations 100*a-c* of a user using an example user computing device. User computing devices may include desktop personal computers, laptop computer, smartphones, tablets, smart televisions and displays, video game systems, set top consoles, virtual reality systems, among other examples. When a user (e.g., 105) engages with a user computing device (e.g., 110), the user may unconsciously or otherwise adopt a posture, bodily orientation, or other ergonomic position that may be suboptimal to the biomechanical, circulatory, or nervous system of the user. For instance, FIG. 1A illustrates a profile of a user 105 who is applying a generally good or healthy posture, including proper positioning of the head and neck, proper positioning of the spine, positioning of the shoulders, as well as positioning of the arms, wrists, and hands (e.g., at an ideal angle relative to the desk, keyboard, mouse, etc.). FIGS. 1B-1C illustrate profiles of the user 105 alternatively adopting a problematic or unhealthy posture (e.g., a posture or biomechanical position that, when applied habitually or over extended periods of time, may injure or otherwise endanger the health of the user 105 when the user is using the user computing device 110). For instance, in FIG. 1B, the user 105 leans forward from a healthier, neutral position (e.g., in FIG. 1A) to adopt a hunched position that results in incorrect positioning of the neck, shoulders, spine, and even wrists. As another example, in FIG. 1C, the user 105 leans away from the user computing device 110, which may strain the lower back, hips, wrists, among other issues.

Human pose, posture, and mood detection has been the source of research in recent years, with interest, for instance, from retailers and other commercial enterprises in better understanding the mood and behavioral tendencies of customers (e.g., as they enter or navigate a store). Human pose and movement detection have also been the subject of research within autonomous vehicle and industrial robotic systems, for instance, to detect humans within an environment and predict their behavior (e.g., vis-à-vis the vehicle or robot) based on the pose or posture of the human (e.g., to predict whether a human is more or less likely to move into the path of the vehicle and prompt evasive movement by the machine). Solutions currently being developed, however, rely on proprietary and expensive sensors, as well as large, resource intensive machine learning models and systems that require specialized computing systems. Such solutions are impracticable in connection with consumer-level user computing devices, both in the cost of such solutions, the physical dimensions of the solutions (which may conflict with their integration within user computing devices, which tend to evolve into thinner and/or smaller form factors), as well as such solutions overwhelming the resources of typical user computing devices (e.g., where memory and processor resources intended to perform the core function of the user computing device (e.g., providing content to a user) would be diverted to the performance of a complex machine learning algorithm used for the secondary purpose of detecting user posture), among other example issues.

In one example, sensors may be provided on a user computer device, which may automatically detect the posture of the user, while the user uses the user computer device. The posture may be continuously sensed, such that the user is provided with immediate and even historical feedback of the user's posture while using the device, including prompts to correct bad posture detected by the user and thereby improve negative health outcomes, which may be connected to users' unconscious and prolonged bad posture while using such devices.

For example, an improved user computing device, such as laptop computers, desktop computers, smart phones, video game consoles, and smart televisions may be equipped with sensors and logic to implement contactless posture detection and provide dynamic and accurate ergonomic feedback to the user. As user computing systems are often mass marketed, the economic model dictates that the bill of materials to construct such systems and their constituent subsystems be constructed with relatively inexpensive hardware so as to allow the price point of the overall system to be assessable to the general populous. This often requires a tradeoff, as advanced, state of the art hardware may guarantee the best or most desirable performance but may make the overall system prohibitively expensive. As such, a contactless posture detection system intended for mass market user computing devices ideally utilizes inexpensive sensor hardware that may be cheaply and easily integrated within existing computing systems. Making such a system accessible to the wider populous allows the potential health and social benefits (from improving user ergonomics) to be maximized. However, solution designs that utilize inexpensive components traditionally challenge the effectiveness and accuracy of subsystems designed for the mass market. For such systems to be accepted and adopted by users, the functionality and features of the system, particularly those relating to health-related feedback, should be accurate, with minimal false detections, so as to earn the trust of users, among other example considerations.

As an example of advanced imaging sensors, full RGB Depth (RGB-D) sensors have been developed, which natively fuse RGB sensors and compatible high resolution depth sensors (e.g., stereo or LiDAR) into a unified solution. Such sensors, given their relatively high cost and advanced performance capabilities, are currently implemented in research and industrial domains, such as robotics, autonomous vehicles, and visual computing research. An RGBD camera, however, is currently out of reach from a price perspective to be integrated within consumer-level user computing devices, without breaking the pricing model for such devices (e.g., where current personal computing RGB cameras are priced under $10 and RGBD cameras in the $100s).

While RGB cameras are readily available in modern user computing devices, posture detection results derived from a single, user-facing RGB camera sensor struggle to accurately capture the true posture of the user. Such a solution is generally likely to return errors in determining user posture in some situations (e.g., back posture) without explicit depth information (e.g., to determine forward and backward lean). While advanced camera or image sensor solutions may serve as a more accurate basis for a posture detection subsystem, such sensors may be prohibitively expensive to include in mass market user computing devices. Further, machine learning models that are built and trained to accept the relatively large and complex data sets from advanced camera sensors (e.g., stereo cameras, RGB-D cameras, etc.) may be unduly heavy and strain the memory and/or compute resources of a conventional user computing device developed for the mass market. Additionally, user-facing cameras have become nearly standard in conventional user computing devices, making it advantageous to implement a posture detection subsystem that makes use of this already available feature. Further, machine learning models developed to utilize conventional camera images may be more management in size and more appropriate for the computing capacity of user computing systems.

In some implementations of user computing devices, a contactless posture detection subsystem may be implemented, which utilizes traditional, user-facing RGB image sensors, by additionally providing a compact and inexpensive time of flight (ToF) sensor to enhance the data obtained from the RGB image with a low resolution depth image (e.g., 8×8 pixels corresponding to the camera's multi-megapixel RGB image). In some cases, the ToF sensor may be utilized in association with additional features of a user computing device, such as user presence detection. The photo image captured by the camera may be utilized to generate a preliminary posture estimation. The low-resolution depth image may be provided as an input, with the preliminary posture estimation, as inputs to a fusion model to introduce minimal additional depth information to lift the remaining ambiguities and markedly improve the accuracy of the posture determination.

Figure 2:
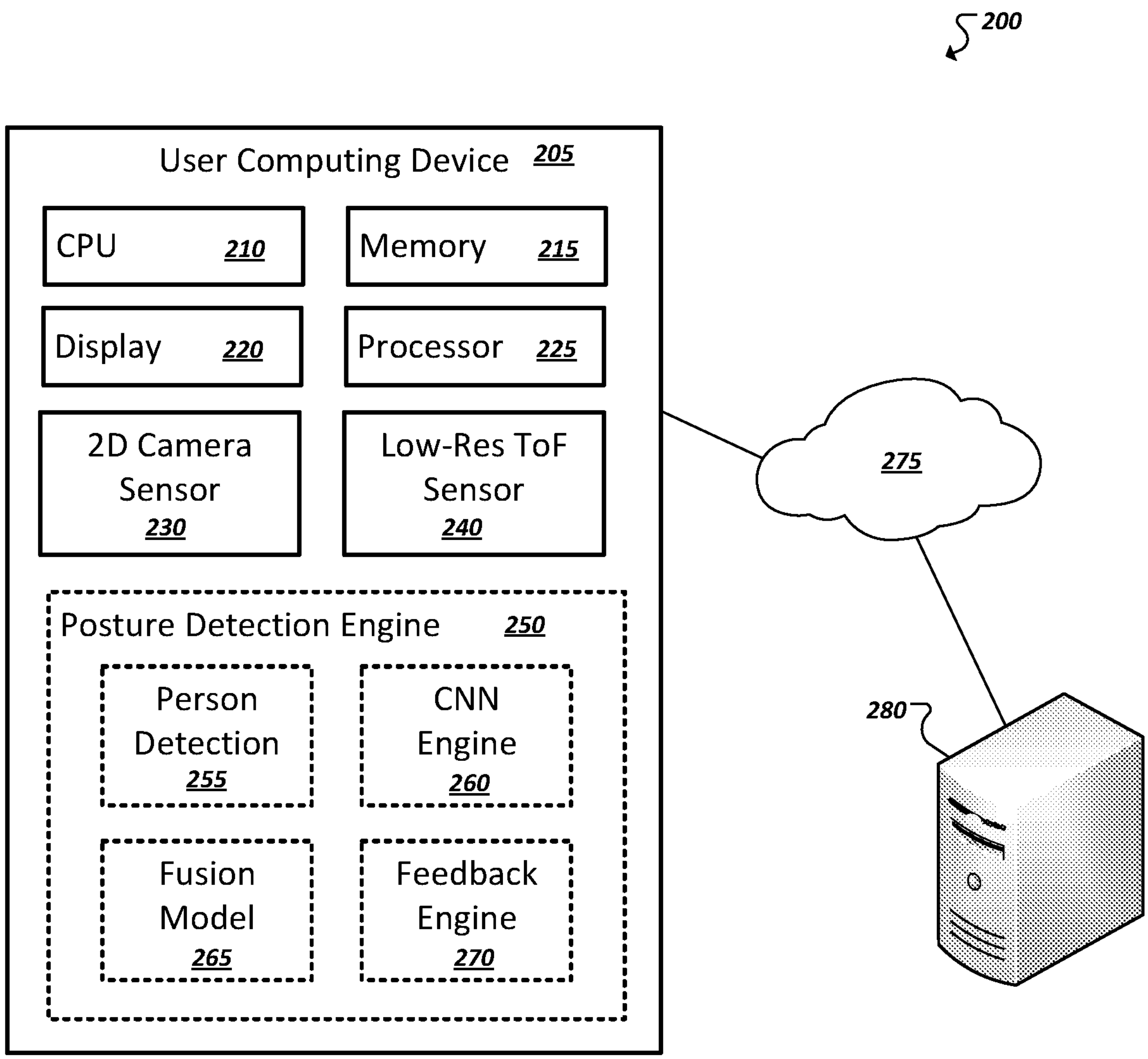
FIG. 2 is a simplified block diagram of an example user computing device.

Turning to the simplified block diagram 200 of FIG. 2, an example user computing device 205 is illustrated. The user computing device 205 may include a combination of a two-dimensional (2D) camera sensor 230 and a low-resolution time-of-flight (ToF) depth sensor 240, which may generate contemporaneous data outputs, which may be provided to a posture detection engine 250 (e.g., implemented hardware, firmware, or software of the user computing device 205) as inputs to machine-learning models implemented using the posture detection engine 250. The user computing device 205 may include one or more general purpose processors, such as a host or central processing unit (CPU) (e.g., 210), as well as one or more local memory blocks (e.g., 215). The processor 210 and memory 215 may be utilized to run one or more programs on the user computing device 205, including an operating system and one or more applications, which may run on the operating system. The user computing device 205 may additionally include one or more display elements 220. The display 220 may be utilized to present information to a user, such as graphical, audio, or other information. The information may constitute content (e.g., video, application graphic user interfaces (GUIs), video games, or other content to the user) of the principal applications and functionality of the user computing device (e.g., the video of smart TV, the video games of a video game console, the GUIs of productivity software run on a PC, among other examples), as well as secondary feedback information, such as feedback information generated by the posture detection engine 250 to alert the user of proper or improper posture detected by the posture detection engine 250, among other examples.

In some implementations, "secondary" programs, such as posture detection engine, may be run on other processor hardware 225 so as not to interfere with the performance of the "principal" applications or content to be implemented using CPU 210. For instance, additional processor(s) 225 may be provided, for instance, in the lid of a laptop computer or elsewhere on the motherboard and may execute at least a portion of the logic of posture detection engine 250. In some implementations, additional processor 225 may implement specialized processing logic, such as processing logic adapted for use in implemented convolutional neural networks (CNNs), deep neural networks (DNNs), spiking neural networks (SNNs), or other machine learning algorithms, which may be relied upon by the posture detection engine 250. Further, additional processing hardware (e.g., 225) may also include near memory (e.g., scratchpad memory), among other elements, to assist in accelerating workloads performed at the processing hardware 225 and/or to offload workloads that may compete with those for execution using CPU 210 and memory 215, among other example implementations.

In one example implementation, a posture detection engine 250, together with camera sensor 230 and depth sensor 240 may implement a posture detection subsystem of the user computing device 205. In one example, posture detection engine 250 may include a person detection engine 255, a neural network engine 260, a fusion engine 265, and a feedback engine 270, among other example components and subcomponents, including components representing subdivisions or combinations of these components, among other example implementations. In one implementation, person detection engine 255 may be implemented in hardware circuitry and/or software to utilize image data generated the camera sensor 230 and/or depth sensor 240 to identify a subarea of the overall image viewed using the camera sensor 230 that corresponds to a person-user using the user computing device 205 and within the field of view of the camera sensor 230 and depth sensor 240. The respective data generated by the camera sensor 230 and depth sensor 240 may be cropped or focused to include data corresponding to the subarea capturing the user and exclude data outside this subarea (e.g., to assist in making the input and the models using the input more lightweight and enhancing the efficiency of these models the user computing device's execution of the posture detection engine, among other example benefits).

A neural network engine 260 may be executed to train and implement a first stage neural network model trained to accept image data generated by the camera sensor 230 (including image data cropped using person detection engine 255) to generate a preliminary determination of the posture of the user based on image data showing the user positioned in front of the user computing device (e.g., laptop computer, desktop computer, smart TV, etc.). In one example implementation, the output of the first stage neural network model implemented using the neural network engine 260 may be a three-dimensional estimation of the user's 3D pose within the environment captured by the camera sensor 230. In one example, the first stage neural network model may be implemented as a DNN topology trained on a large corpus of data (e.g., images of many different users of the same or a similar user computing device in various lighting, at various distances from the user computing device, among other variables, from which the ground truth of each user's true posture is known), among other examples. In one example, neural network model may be a unified body model with a number of shape parameters, including vertices and joints corresponding to elements of the human anatomy (e.g., the SMPL-X model or another model modeling human structure anatomy). The neural network model may output a feature set (based on the 2D image input) that defines the position and/or angles of various joints of the human user identified in the 2D image, including position of joints corresponding the spine, the neck/skull, shoulders, elbows, wrists, hips, knees, ankles, among other examples. In some implementations, the camera of the user computing device (e.g., in a laptop, smartphone, desktop, etc.) may only capture the upper body of the user and the neural network model may focus on generating a feature set from an image input corresponding upper body joints. In other implementations, the camera of the user computing device captures more than the upper body, such as a smart TV or video game console, where the user may be typically positioned a greater distance away from the user computing device and its camera, allowing additional features of the user's position and posture to be determined using the trained neural network model (e.g., to detect positioning and angles of joints at the hip, knee, ankles, lower back, etc.), among other example implementations. Correct or incorrect posture may be determined from these feature set (e.g., based on the combination of joint positions and angles corresponding to joint positions and/or angles characteristic of a healthy or incorrect posture).

Figure 3A:
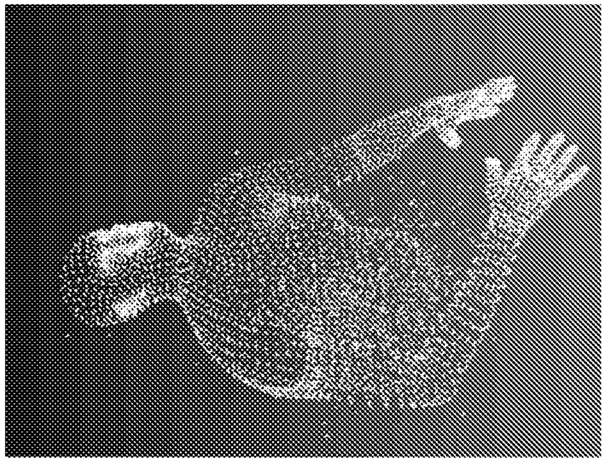
FIGS. 3A-3B illustrate example generation of feature set data related to the physical pose of a user from execution of a neural network model based on a two-dimensional image of the user.
Figure 3A:
Figure 3A:
Figure 3B:
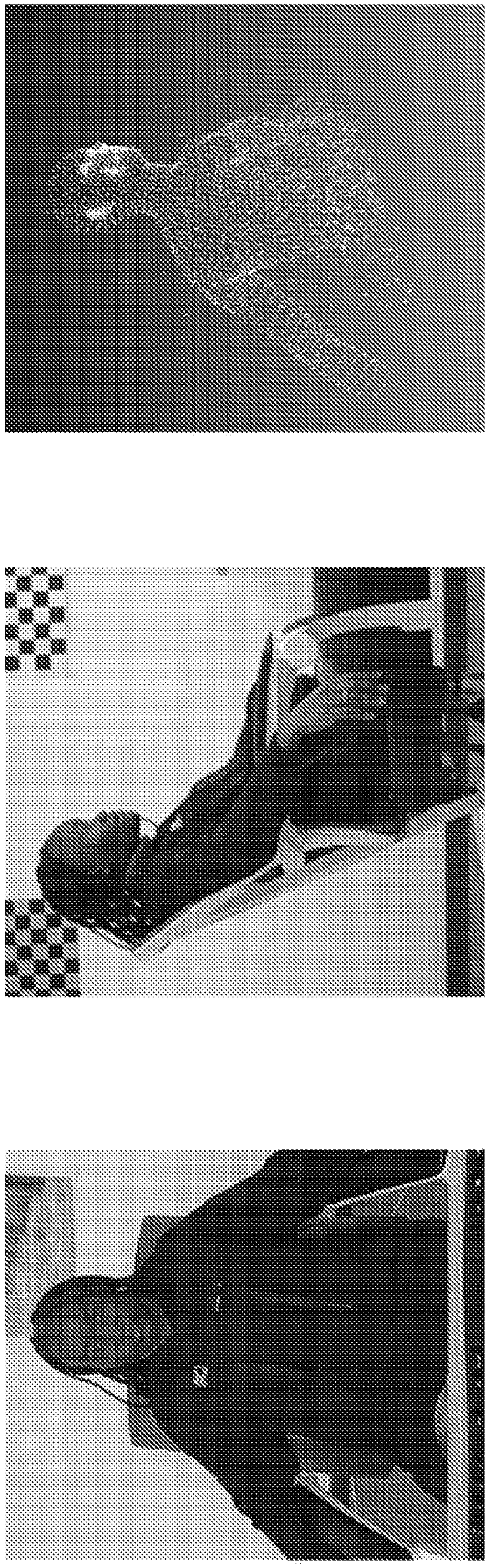

Turning to FIGS. 3A-3B, example results of a neural network model (e.g., a first stage neural network model) used to predict the 3D posture of a user of a user computing device from only 2D image data captured (e.g., by a camera) at the user computing device are shown. FIG. 3A shows a first example, where a 2D photographic image 305 is captured at an example user computing device (e.g., a personal computer) of a user using the computing device. A 3D point mesh model 310 is generated by providing the image 305 as an input to an example to a neural network-based body model. FIG. 3B shows another example, wherein another 2D image 315 is captured of the same user using the same user computing device at another point in time. 3D point mesh model 320 is generated as an output of the same example neural network-based body model based on providing image 315 as an input to the model. From the frontal view of the user alone (e.g., as captured by a user computing device camera in images 305, 315), it may be difficult to distinguish the actual posture of the user. For instance, image 325 in FIG. 3A shows a side view of the user (not captured by the system), which illustrates the ground truth flexion angle of the user's seated posture. Similarly, side view image 330 shows the actual flexion angle of the user's seated posture. While the model output 310 appears to accurately reflect the overall posture of the user in the example of FIG. 3A, the model output 320 generated from image 315 in the example of FIG. 3B is less accurate and fails to capture the extent to which the user leans backward (e.g., in a potentially unhealthy manner). This may be representative of systematic errors on the part of a posture detection subsystem, which relies solely on 2D images to detect user posture.

To address errors and inaccuracy of an image-only based posture detection system, in some implementations, the system may be further enhanced to utilize inexpensive, easy-to-integrate, and/or low resolution depth sensors provided in addition to a webcam or other camera sensor of the user computing device to improve the accuracy of the posture detection system, such as improving the accuracy of measurements of how much the user leans forward or away from the device, as well as the angle of arms, wrists, hands, legs, or feet that face the camera of the user computing device. For instance, a user computing device may include a simple low cost ToF sensor. The ToF sensor may provide depth information at a low resolution (e.g., exponentially lower than the (e.g., megapixel level) resolution of the camera, for instance, on the order of 8×8, 16×16, 16×9, etc.) over the image. At least a subset of the ToF sensor's readings may be identified as corresponding to points on the user's body and correspond in time to a respective image collected by the camera of the user computing device (e.g., capturing the upper body of a user while the user sits at a PC user computing device). The data from the ToF sensor can be integrated to a neural network model (e.g., DNN) used for posture detection by adding additional inputs at the input layer of the DNN. During training on data that includes the ToF and camera sensor, the neural network model may automatically learn to make use of the additional low-resolution depth information to minimize the cost function that corresponds to the ground truth during training. Once trained, the sensor fusion model will make use of the depth information to make a better prediction of the user's posture and allow the posture detection subsystem to generate and deliver more accurate results to the user.

Returning to the discussion of FIG. 2, an output, or preliminary posture determination, generated by a neural network engine 260 using a neural network model trained to recognize human anatomical positioning from a single 2D photographic image, may be enhanced using a sensor fusion model, executed using fusion model engine 265, which further takes, as an input, a depth map data generated using a low-resolution depth sensor 240 that corresponds (e.g., in time) to the 2D image to generate an improved posture determination of a user of the user computing device 205. In one example, a particular 2D image generated by camera sensor 230 may be used by the neural network engine 260 to generate a feature set representing the preliminary posture determination (e.g., measurements of a set of joints of the body of the user based on the particular image, together with the relative positions of each of the joints and/or angles (e.g., flexion angles) of the set of joints). This feature set output may be provided, with depth map data generated contemporaneously with the particular 2D image by the low-resolution depth sensor 240, as inputs to a sensor fusion model (e.g., a lower-resolution neural network or other model) to generate a second feature set result representing a higher accuracy prediction of the user's posture based on a combination of the 2D image and the corresponding depth map data.

In some implementations, second feature set data, generated using fusion model engine 265, may be processed by a feedback engine 270 to identify that the second feature set data describes physical features of the user indicative of a good, healthy posture by the user, or alternatively, incorrect or harmful posture by the user. The feedback engine 270 may generate feedback data based on identifying the posture of the user for consumption by the user. For instance, feedback data may be presented to the user through a user interface, such as display 220, a secondary display of the user computing device 205, a speaker (e.g., as audio feedback), or even via a separate coordinating device (e.g., a wearable, such as a smartwatch in communication with the user computing device), among other examples. In some implementations, presentation of feedback information indicating correct/incorrect posture or other biomechanical/ergonomic (e.g., relating to neck/head positioning, arm/wrist/hand positioning on a keyboard or mouse, etc.) may be triggered in response to a single result of the sensor fusion model engine 265 (e.g., based on a single RGB image-depth map pair) or, alternatively, in response to a series of consistent results generated by the sensor fusion model engine 265 indicating that the user has been detected as maintaining a given posture or positioning over a span of time (e.g., based on a series of RGB image-depth map pairs captured by the camera sensor 230 and low-resolution depth sensor 240 and provided to a trained sensor fusion model executed using the sensor fusion model engine 265).

In some implementations, posture determinations embodied in the second feature set data and/or feedback data generated by the posture detection engine 250 may be shared or transmitted by the user computing device 205 to external computing systems 280 (e.g., via one or more communication networks (e.g., 275). Such data may be anonymized and/or encrypted and may be further processed by other trusted services, for instance, as part of a health monitoring service, therapeutic services, services offering gamification of proper work habits, social networks, etc., which may be used to further enhance the adoption and resulting health benefits that may be derived by providing users of user computing devices, with real time biofeedback to improve their biomechanical habits and body positioning when using such devices, among other example applications and potential benefits. Results generated by services or applications hosted on the user computing device 205 or one or more external computing devices (e.g., 280) may also be presented to the user (e.g., in addition to feedback information generated by the posture detection engine), among other example features.

In some cases, external computing systems (e.g., 280), with which a user computing device (e.g., 205) may provide remotely hosted services, such as data storage, information services, geolocation services, and computational services (e.g., data analytics, search, diagnostics, etc.). In some cases, data generated from these remotely hosted service may be returned to the user computing device 205 to be consumed by the posture detection engine 250 or other applications hosted on the user computing device 205, for instance to provide enhanced feedback, functionality, or other example features. One or more networks (e.g., 275) can facilitate communication between the user computing device 205 and external computing devices (e.g., 280). Such networks can include wired and/or wireless local networks, public networks, wide area networks, broadband cellular networks, the Internet, and the like.

In general, "servers," "clients," "computing devices," "network elements," "hosts," "system-type system entities," "user devices," "gateways," "IoT devices," "sensor devices," and "systems" (e.g., 205, 280, etc.) in an example computing environment, can include electronic computing devices operable to receive, transmit, process, store, or manage data and information associated with the computing environment. As used in this document, the term "computer," "processor," "processor device," or "processing device" is intended to encompass any suitable processing apparatus. For example, elements shown as single devices within the computing environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple IOS, Google Android, Windows Server, etc., as well as virtual machines adapted to virtualize execution of a particular operating system, including customized and proprietary operating systems.

In some implementations, a user computing device 205 may be participate with other devices, such as wearable devices, Internet-of-Things devices, connected home devices (e.g., home health devices), and other devices in a machine-to-machine network, such as Internet-of-things (IOT) networking, a fog network, connect home network, or other network (e.g., using wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity).

Figure 4:
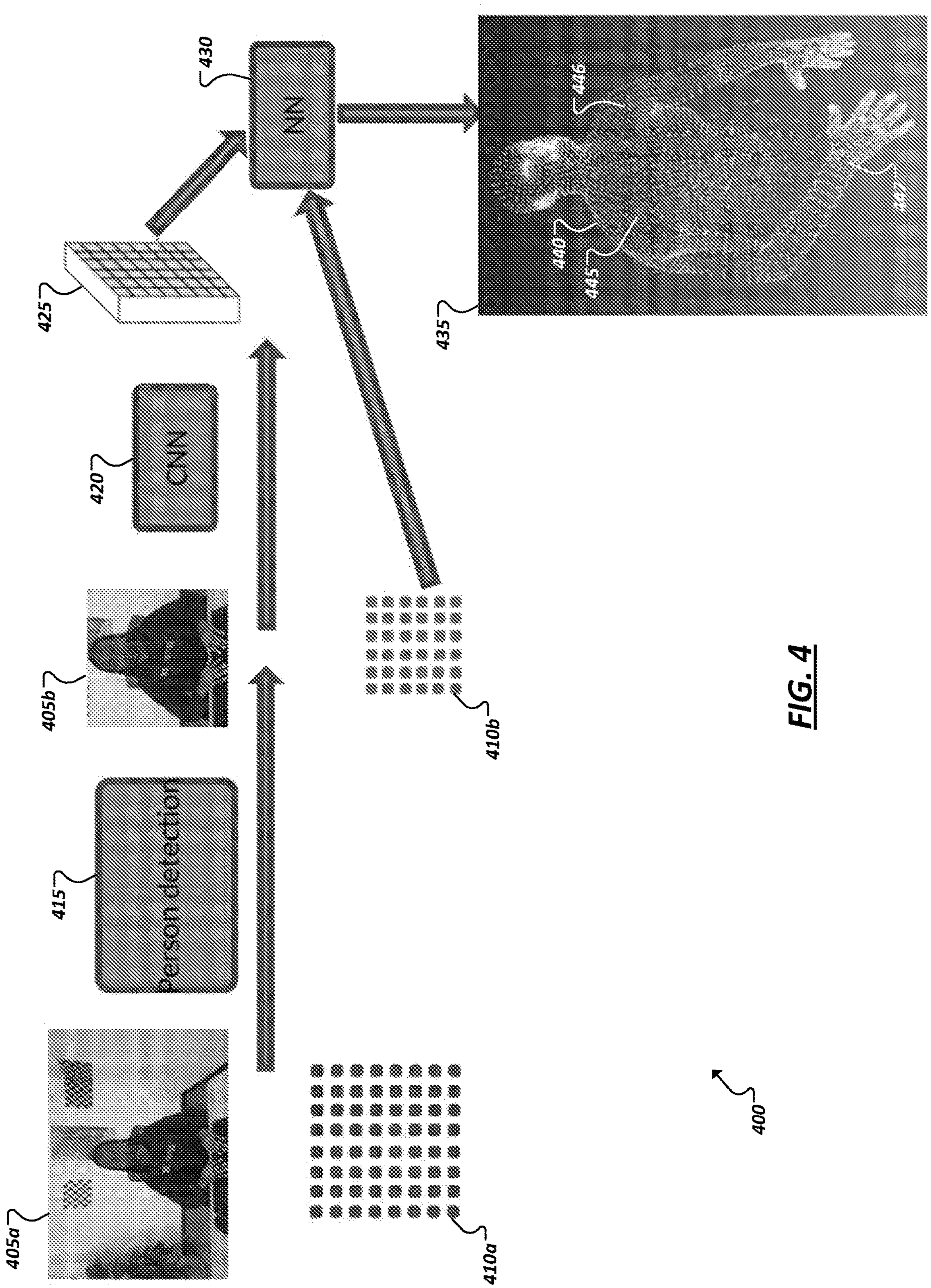
FIG. 4 is a simplified block diagram illustrating an example pipeline of a posture detection subsystem of a user computing device.

Turning to FIG. 4, a simplified block diagram 400 is shown illustrating an example system of machine learning models implemented by an example posture detection engine of a user computing device to derive biomechanical feedback to a user of the user computing device based on fusion of 2D image data (e.g., RGB data) and depth sensor data collected at the user computing device. While the data generated by a camera sensor and depth sensor on the user computing device may be valuably leveraged by a posture detection engine, in some implementations, the use of the camera sensor and/or depth sensor may be secondary to their primary purpose or application within the using computing device. For instance, the 2D camera sensor may be a customary digital camera integrated in the device, which functions as a general-purpose camera, webcam, or other camera sensor. Similarly, in some examples, a low-resolution depth sensor integrated in the device may provide functionality for the user computing device system, such as user presence detection (of the user at the user computing device), detect a physical obstruction to the camera or display of the user computing device (e.g., and thus the effective disablement of a posture detection engine that utilizes the camera sensor), detect closure of a laptop shell of the user computing device, among other examples.

In one example, the respective fields of view of each of the camera sensor and the depth sensor of a user computing device may be configured or calibrated to align to each capture a similar view of user(s) of the user computing device. As shown in FIG. 4, a 2D image 405*a* is captured by an RGB camera of the user computing device contemporaneously (e.g., at a first point in time) with the generation of depth data 410*a* captured (e.g., at the first point in time) by the depth sensor (e.g., low resolution ToF sensor) on the user computing device. When originally generated, the image 405*a* and depth data 410*a* may have respective original dimensions (e.g., in accordance with the aspect ratio of the camera or resolution of the depth sensor). In one example, the original version of the image 405*a* may be provided to a person detection model 415 to detect the portion of the overall original image 405*a* that includes a person or persons in the field of view (e.g., using a CNN-based person detection model). A cropped or focused version (405*b*) of the image may be generated as an output of the person detection model 415, with the cropped version of the image including the portion of the image with views of the person (and excluding extraneous portions of the original image 405*a* (e.g., background imagery, etc.). An alignment may be defined between the depth data 410*a* and the original image 405*a*. Based on this alignment, portions of the depth data 410*a* that correspond to the portions of the original image 405*a* kept in the cropped version of the image 410*a* may be identified. Accordingly, the depth data 410*a* may be likewise cropped to form cropped depth data 410*b* to keep those points in the depth data that correspond to a person-user detected by the person detection model 415. This allows lower dimensioned data to be provided to subsequent stages of the posture detection system, allowing for more efficient and compact machine learning models and associated logic. In some implementations, a person detection model may be trained to identify multiple distinct persons (e.g., viewers of a smart television or players of a video game system) and develop multiple cropped images and depth data each corresponding to a respective one of the multiple detected users. The cropped images and depth data may be used in subsequent stages/models of the posture detection subsystem to determine respective posture/positioning results for each of the multiples users, among other example features.

Continuing with the example of FIG. 4, the cropped version of the image 405*b* may be provided as an input to a neural network model 420 configured and trained to identify, from a single 2D image, a feature set output 425 describing a set of features representing the overall physical posture of a user that is the subject of the cropped image 405*b*. For instance, the neural network model 420 may take the high-resolution cropped image 405*b* as an input. The neural network backbone of the model may be applied to the RGB data resulting in an output 425 applying high dimension features on a low-resolution grid (e.g., 8×8, 16×16, etc.). The feature set output 425 may then be provided as an input with the cropped depth image data 410*b* to a subsequent sensor fusion model 430 (e.g., a second neural network or other classical or machine learning-based sensor fusion model) to produce an enhanced feature set 435 representing the estimated posture of the user captured in the cropped image 405*b* and cropped depth image 410*b*. The feature set 435 may define the general form and pose of the human user 440. The feature set 435 may additionally identify attributes of joints (e.g., 445-447) of the user's body, such as the relative position and/or angle of each of the joints. In some implementations, the sensor fusion model 430 or another additional may generate an inference, from the feature set 435 whether the user is adopting or maintaining a "good" biomechanically healthy posture or, alternatively, one of a variety of less healthy, suboptimal, or "bad" postures. Corresponding feedback may be generated and presented in real time to the user, for instance, at the same user computing device to allow the user to make adjustments to their posture (or maintain a good posture).

As introduced above, in some implementations, the computing (e.g., processing and memory) resources of a user computing device may be relatively constrained, compared to computers more specifically configured for performing machine learning operations. In some instances, a separate computing subsystem may be provided for use in executing a posture detection engine, such as a lid control hub located in a lid section (e.g., with the display) in a laptop, separate from the motherboard below the keyboard of the laptop, among other examples. The use of a sparse depth image (e.g., 410*a*-410*b*) may allow a simple (e.g., relative to the first stage neural network model 420) and lower dimension machine learning model to be utilized to implement second stage model 430. The use of smaller models (e.g., 430) may assist with fitting such models for use on secondary or companion chips on the user computing device (e.g., separate from the CPU of the user computing device), particularly where such companion chips have lower memory footprints.

Training of the machine learning models (e.g., 415, 420, 430) used in a posture detection pipeline (e.g., as illustrated in the example of FIG. 4) may be based on training data that is specific to the user computing device and its composite camera and depth sensor. In some instances, training of machine learning models used in a posture detection subsystem may use general image data collections and may be refined or enhanced through subsequent training using training data captured of the actual owner-user of a given user computing device and the environment in which this user computing device is located, among other examples. A user may also provide feedback to effectively provide a supervised training loop to confirm the accuracy of feedback results generated by the posture detection subsystem, among other example features. In some implementations, the training of the machine learning pipeline or two or more models in the pipeline, may be performed end-to-end through back-propagation, to allow results of the second stage machine learning model 430 to impact and refine preceding models in the pipeline (e.g., the first state posture detection neural network model 420) to further enhance the accuracy and effectiveness of a posture detection subsystem, among other example implementations.

Figure 5:
FIG. 5 is an image illustrating an overlay of depth sensor data over an image from a camera sensor of an example user computing device.

In some implementations, a low-resolution depth sensor may have a different field of view than that of the corresponding high resolution camera sensor on the user computing device. Turning to FIG. 5, an example is shown of an image 500 captured by a forward-facing RGB camera of a user computing device (e.g., a laptop). To illustrate an example of the incongruent field of view of a depth sensor also on the user computing device, an overlay 505 is shown of the individual measurements or depth pixels (e.g., 510, 515, 520) captured by the depth sensor (e.g., a depth sensor with 8×8 pixel resolution). In this example, the depth sensor may be implemented a low-resolution (e.g., 8×8, 16×16, 32×32, etc.) multizone ranging sensor with a 63-degree diagonal field of view (FOV). Such a sensor may result in a resolution of approximately 10 cm/pixel for a subset 1 meter or less from the camera, allowing 6 or more of the depth pixels to capture the subject. For instance, in the example of FIG. 5, 16 depths pixels (e.g., depth pixel 520) correspond to measurement of (or "hits" on) the subject user. In some implementations, the depth sensor may be a ToF sensor, for instance, implemented as an all-in-one emitter, receiver, and processor (to determine distance from the reflected emission) integrated within a single device and capable of being integrated within various user computing devices. A depth sensor device may be implemented using various technologies including ToF sensors using Class 1 invisible laser emitters, radar, Lidar, millimeter wave, or other examples.

The technology, resolution, angle, field of view, and other attributes and configurations of a depth sensor of a user computing device may be selected based on the anticipated user interactions with the user computing device. As an example, a depth sensor may be used and so configured on a given user computing device so as to effectively guarantee that the depth sensor will consistent generate a minimum or threshold number of depth pixels to measure a user of the user computing device during the user's anticipated use of the computing device. For instance, different user computing devices may adopt different depth sensors to account for the user anticipated distance from the user computing device and its sensors during the user's (or users') use of the user computing device. The minimum or threshold number of depth pixel "hits" may correspond to a number determined to yield improvements to a 2D-image-only-based posture determination using a sensor fusion model, such as described in the example of FIG. 4. In some implementations, the depth sensor may be programmable and/or controllable to adjust the field of view or capture angle based on the detection of a user, the attributes (e.g., FoV or aspect ratio of the RGB camera), an anticipated use of the user computing device, among other examples.

Figure 6B:
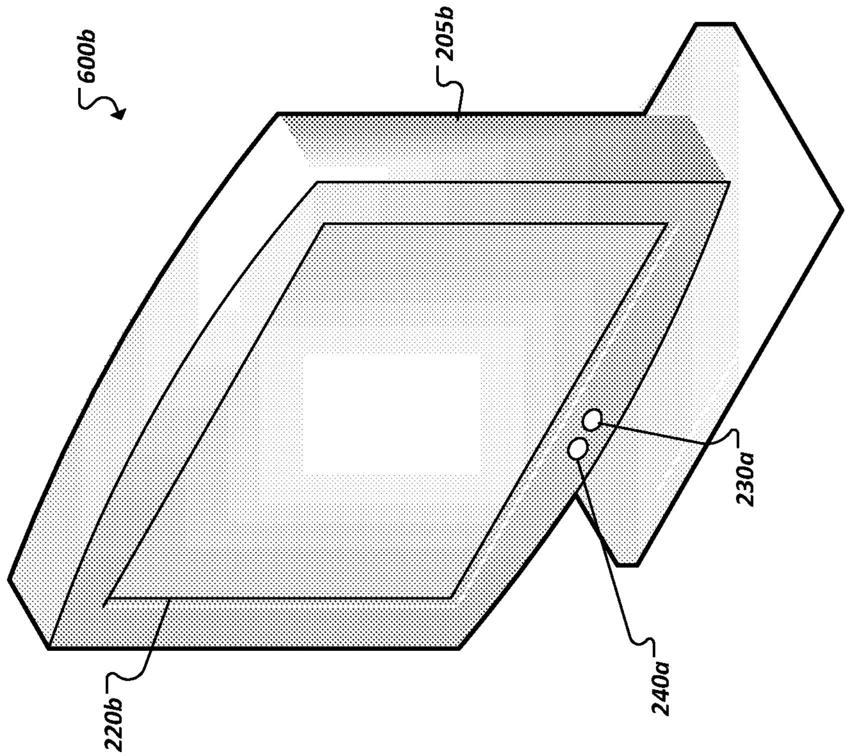
FIG. 6A-6B are diagrams illustrating example user computing devices with integrated camera and depth sensors.
Figure 6A:
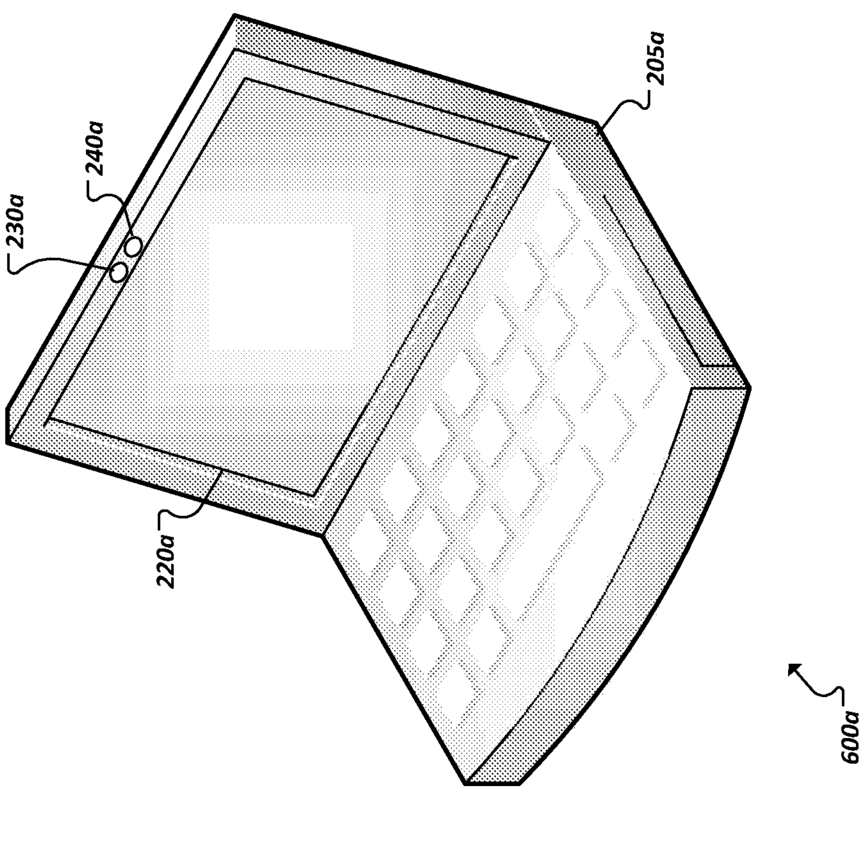

FIGS. 6A-6B are diagrams 600*a*, 600*b* illustrating different example implementations of user computing devices 205*a*, 205*b* each equipped with a respective camera sensor (e.g., 230*a*, 230*b*) and depth sensor (e.g., 240*a*, 240*b*) mounted on or integrated in the device. It should be appreciated that the examples of FIGS. 6A-6B are but a representation of two of potentially many different types and forms of user computing devices. In some implementations, the user computing device (e.g., a laptop 205*a*, a smart TV 205*b*, a gaming system (e.g., home video gaming system, a casino gaming system, etc.), etc.) may include a graphical display (e.g., 220*a*, 220*b*). In some instances, it may be assumed that the user of the device (e.g., 205*a*, 250*b*) will orient themselves consistently toward the display (e.g., 220*a*, 220*b*) when using the device. Accordingly, in such implementations, the camera sensor (e.g., 230*a*, 230*b*) and depth sensor (e.g., 240*a*, 240*b*) pair may be directed to align with the orientation of the display (e.g., 220*a*, 220*b*) to best capture the user. The sensor pair may be positioned adjacent to each other in some implementations, such as in the examples of FIGS. 6A and 6B. In other implementations, the camera and depth sensors may be positioned to maintain some amount of separation or relative angle between the sensors. Sensors (e.g., 230*a*-*b*, 240*a*-*b*) may be positioned, in some implementations, in a bezel above, (e.g., as in FIG. 6A), below (e.g., as in FIG. 6B), or to the side (not shown in the examples of FIGS. 6A-6B) the display (e.g., 220*a*, 220*b*), among other examples. In some instances, the camera and depth sensors may be positioned on a portion of the user computing device away from its displays. In some instances, the user computing device may lack an integrated display and the camera sensor-depth sensor pair may be positioned on the user computing device based on how a user is anticipated to interact with (e.g., face) the user computing device.

Figure 7:
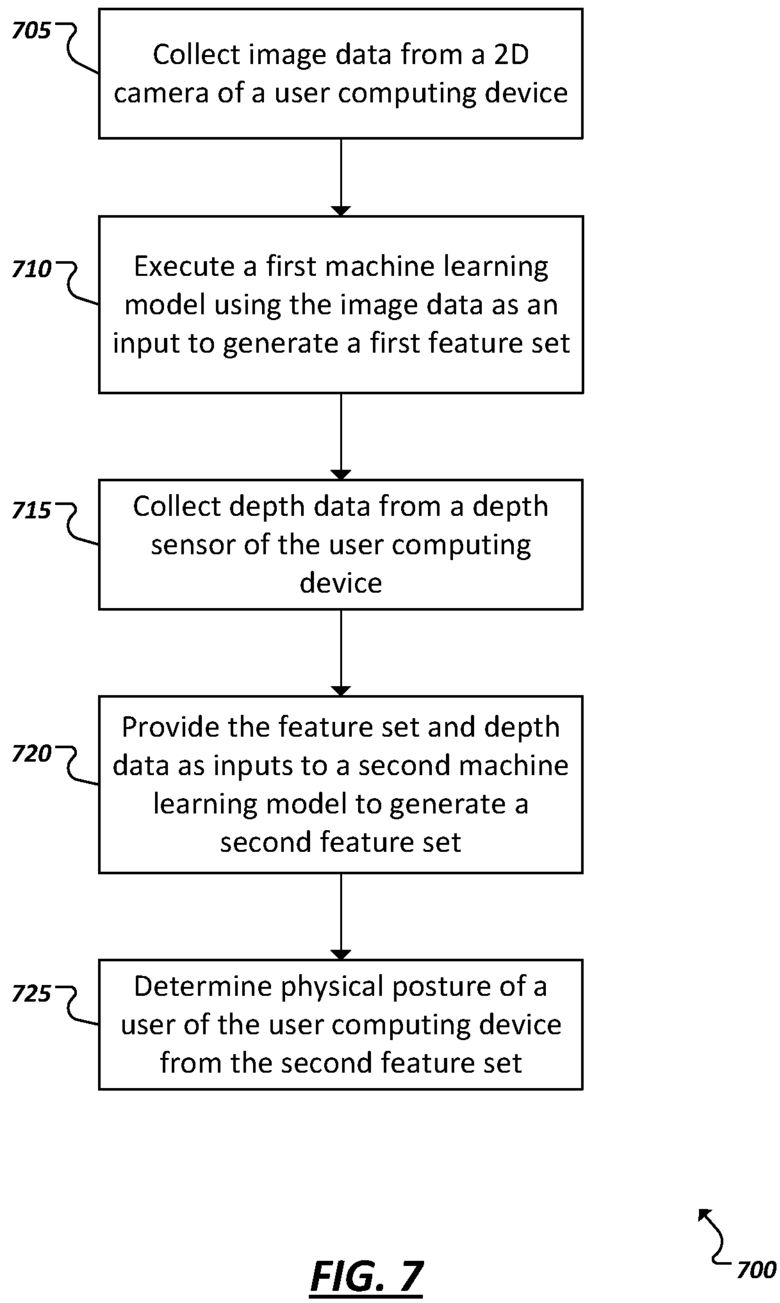
FIG. 7 is a simplified flow diagram illustrating example techniques for detecting human posture using a user computing device.

FIG. 7 is a simplified flowchart 700 illustrating an example technique for determining a posture of a human user of a user computing device at the user computing device using a camera sensor and a depth sensor. Image data may be captured 705 by the camera sensor and received by a posture detection subsystem executed on the user computing device. The image data may be provided as an input to a first machine learning model (e.g., a CNN) trained to predict the posture of a user of the user computing device captured in the image (as well as potentially other features of the user's biomechanical positioning). Execution 710 of the first machine learning model, using the image data input, may result in the generation of a first feature set (e.g., an array, vector, matrix, tensor, or other data) that indicates predicted attributes of each of a set of points, joints, limbs, or other parts of user's anatomy based on the provided image. The posture detection subsystem may also collect 715 depth data from the depth sensor on the user computing device, which was captured contemporaneously or otherwise in coordination with the image data. The depth data and image data may each respectively capture a view from the user computing device of a human user at a given point in time. The depth data may be provided 720 with the first feature set data as inputs to a second machine learning model, such as a neural network, trained to also derive a feature set describing attributes of the human user's physical pose or positioning. Indeed, execution of the second machine learning model, using the first feature set and depth data as inputs, may generate second feature set data also representing the pose and posture of the captured user. The second feature set data may represent an improved version of the first feature set data (e.g., and include values for the same set of features), with the second feature set improving accuracy of the predicted user's pose based on a refinement of those features, which may be ambiguous when viewed from a 2D perspective and angle (e.g., whether the user or parts of the users' body are leaning toward or away from the user computing device), among other example features. The second, improved feature set returned from the second machine learning model, may serve as the basis for automated predictions or determinations to be made 725 regarding the posture of the user. The determination may form the basis of feedback data generated to alert the user of the findings of the posture detection subsystem, empowering the user to either change unhealthy or continue health behavior based on the posture feedback provided through the user computing device.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 8:
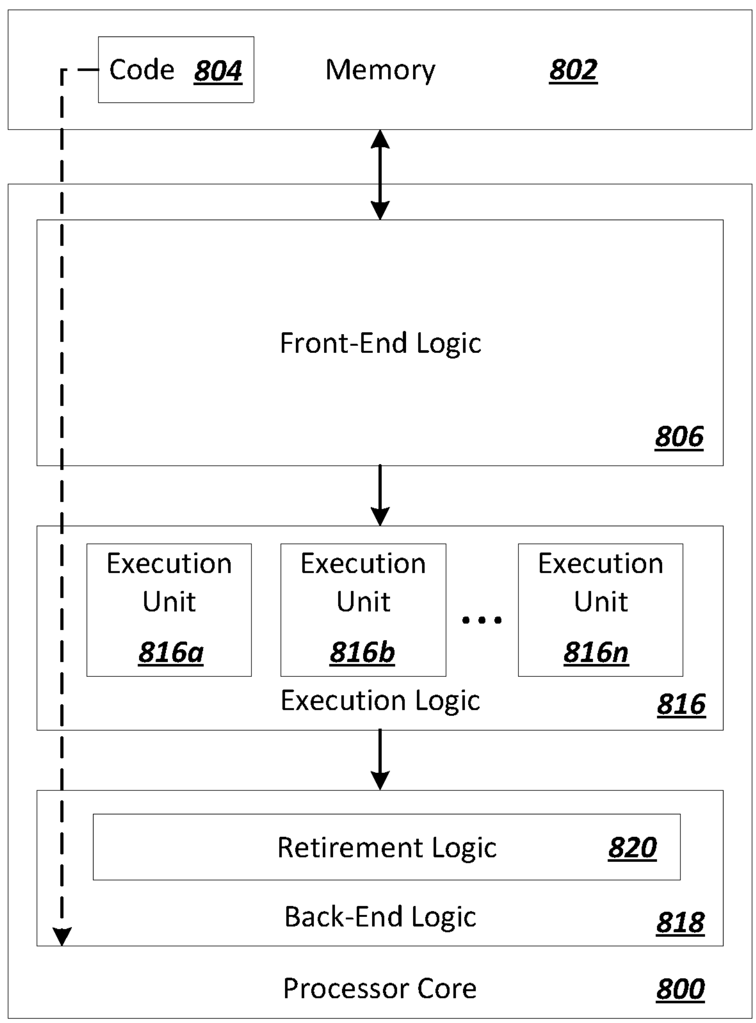
FIG. 8 is a simplified block diagram of an example processor of a computing device.
Figure 9:
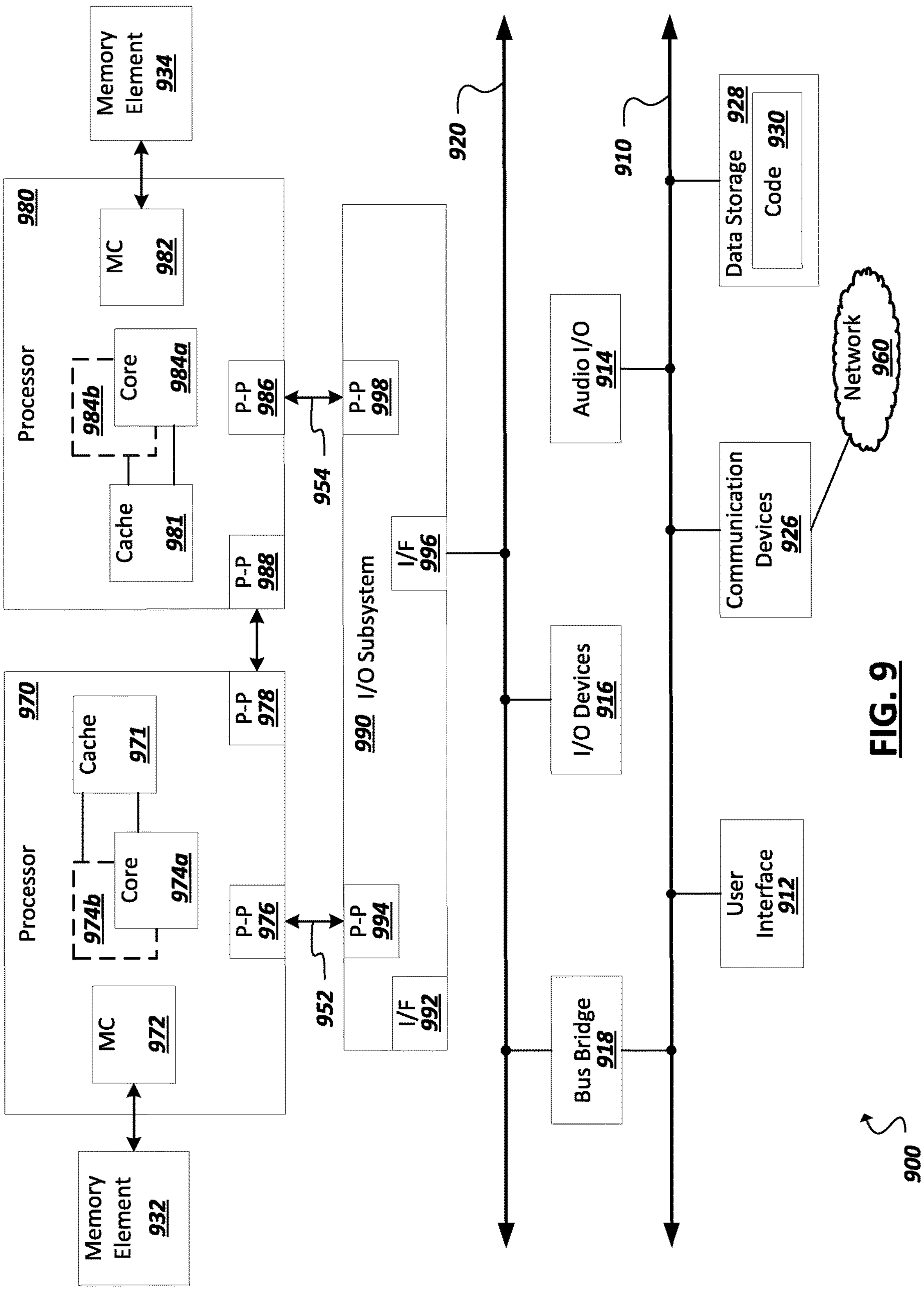
FIG. 9 is a simplified block diagram of an example computing system.

FIGS. 8-9 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro-operation such as a fixed width micro operation in a predefined format, or may generate other instructions, microinstructions, or control signals that reflect the original code instruction. Front-end logic 806 also includes register renaming logic 810 and scheduling logic 812, which generally allocates resources and queue the operation corresponding to the instruction for execution.

Processor 800 can also include execution logic 814 having a set of execution units 816*a*, 816*b*, 816*n*, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 800.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a co-processor 938, such as a high-performance graphics circuit, machine learning accelerator, or other co-processor 938, via an interface 939, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine-readable storage medium with instructions stored thereon, the instructions executable by the machine to cause the machine to: receive image data generated by a camera with a first resolution, where the camera is provided on a user computing device to capture an image of a user of the user computing device; execute a first machine learning model trained to determine a feature set associated with posture of the user from the image data; receive depth data generated by a time of flight sensor provided on the user computing device, where the depth data has a second resolution lower than the first resolution and is generated contemporaneously with generation of the image data; provide the first feature set as a first input and the depth data as a second input to a second machine learning model to generate a second feature set as an output of the second machine learning model; and determine a posture of the user from the second feature set.

Example 2 includes the subject matter of example 1, where the image data includes two-dimensional red-green-blue (RGB) image data.

Example 3 includes the subject matter of any one of examples 1-2, where dimensions of the first features set are lower than dimensions of the image data.

Example 4 includes the subject matter of any one of examples 1-3, where the instructions are further executable to cause the machine to: provide a first version of the image data to a person detection model to detect that a view of the user occupies a subarea of the image data; and generate a cropped version of the image data, where the cropped version of the image data includes the subarea, where the cropped version of the image data is provided as an input to the first machine learning model.

Example 5 includes the subject matter of example 4, where the instructions are further executable to cause the machine to: determine a subset of depth pixels of the depth data corresponding to the subarea; and crop the depth data to generate a cropped version of the depth data to include the subset of depth pixels, where the cropped version of the depth data is provided as the second input to the second machine learning model.

Example 6 includes the subject matter of any one of examples 1-5, where the first machine learning model includes a convolutional neural network.

Example 7 includes the subject matter of any one of examples 1-6, where the first feature set and the second feature set each define a set of features associated with whether a body part of the user is angled toward or away from the user computing device.

Example 8 includes the subject matter of example 7, where the set of features in the second feature set are more accurate than the set of features in the first feature set.

Example 9 includes the subject matter of example 8, where the body part includes a torso of a user.

Example 10 includes the subject matter of example 8, where the body part includes a limb of a user.

Example 11 includes the subject matter of any one of examples 1-10, where the camera includes a webcam integrated into the user computing device and the ToF sensor includes a low-resolution ToF sensor integrated into the user computing device.

Example 12 includes the subject matter of any one of examples 1-11, where the user computing device includes one of a laptop computer, a desktop computer, a smart television, or a gaming system.

Example 13 includes the subject matter of any one of examples 1-12, where the instructions are further executable to cause the machine to determine whether the posture of the user is correct or incorrect based on the second feature set.

Example 14 includes the subject matter of example 13, where the instructions are further executable to cause the machine to generate feedback data for presentation to the user, where the feedback data identifies whether the posture of the user is correct or incorrect.

Example 15 is a method including: receiving two-dimensional image data generated by a camera of a user computing device, where the image data includes an image of a user using the user computing device; applying a first machine learning model to the image data to generate a first feature set, where the first feature set identifies features of a pose of the user from the image data; receiving depth data generated by a depth sensor of the user computing device, where the depth data includes a grid of depth pixels and is generated contemporaneously with the image data; providing the first feature set as a first input and the depth data as a second input to a second machine learning model to generate a second feature set as an output of the second model; and determining a posture of the user from the second feature set.

Example 16 includes the subject matter of example 15, further including determining whether the posture of the user is correct or incorrect based on the second feature set.

Example 17 includes the subject matter of example 16, further including generating feedback data for presentation to the user, where the feedback data identifies whether the posture of the user is correct or incorrect.

Example 18 includes the subject matter of any one of examples 15-17, where the image data includes red-green-blue (RGB) image data.

Example 19 includes the subject matter of any one of examples 15-18, where dimensions of the first features set are lower than dimensions of the image data.

Example 20 includes the subject matter of any one of examples 15-19, further including: providing a first version of the image data to a person detection model to detect that a view of the user occupies a subarea of the image data; and generating a cropped version of the image data, where the cropped version of the image data includes the subarea, where the cropped version of the image data is provided as an input to the first machine learning model.

Example 21 includes the subject matter of example 20, further including: determining a subset of depth pixels of the depth data corresponding to the subarea; and cropping the depth data to generate a cropped version of the depth data to include the subset of depth pixels, where the cropped version of the depth data is provided as the second input to the second machine learning model.

Example 22 includes the subject matter of any one of examples 15-21, where the first machine learning model includes a convolutional neural network.

Example 23 includes the subject matter of any one of examples 15-22, where the first feature set and the second feature set each define a set of features associated with whether a body part of the user is angled toward or away from the user computing device.

Example 24 includes the subject matter of example 23, where the set of features in the second feature set are more accurate than the set of features in the first feature set.

Example 25 includes the subject matter of example 24, where the body part includes a torso of a user.

Example 26 includes the subject matter of example 24, where the body part includes a limb of a user.

Example 27 includes the subject matter of any one of examples 15-26, where the camera includes a webcam integrated into the user computing device and the ToF sensor includes a low-resolution ToF sensor integrated into the user computing device.

Example 28 includes the subject matter of any one of examples 15-27, where the user computing device includes one of a laptop computer, a desktop computer, a smart television, or a gaming system.

Example 29 is a system including means to perform the method of any one of examples 15-28.

Example 30 is an apparatus including: a processor; a memory; a display; a camera sensor oriented to face a human viewer of the display; a depth sensor oriented to face the human viewer of the display; and a posture detection engine executable by the processor to: receive two-dimensional image data generated by the camera, where the image data includes an image of the human viewer; provide the image data as an input to a first machine learning model to determine a first feature set, where the first machine learning model is trained to determine a post of a human from two-dimensional images; receive depth data generated by the depth sensor contemporaneously with generation of the image data, where the depth data includes one or more depth measurements of the human viewer; provide the first feature set as a first input and the depth data as a second input to a second machine learning model to generate a second feature set as an output of the second machine learning model; determine a posture of the human viewer from the second feature set; and determine quality of the posture of the human viewer based on the second feature set.

Example 31 includes the subject matter of example 30, further including a central processing unit (CPU), where the processor is separate from the CPU, and logic implementing primary functionality of a user computing device is executed using the CPU.

Example 32 includes the subject matter of example 30, where the apparatus includes a user computing device, and the user computing device includes the processor, the display, the camera, the depth sensor, and the posture detection engine.

Example 33 includes the subject matter of example 32, where the user computing device includes one of a laptop computer, a desktop computer, a tablet computer, a smart television, or a video gaming system.

Example 34 includes the subject matter of any one of examples 30-33, where the camera and the depth sensor are embedded in a bezel, where the bezel at least partially frames the display.

Example 35 includes the subject matter of any one of examples 30-34, where the camera includes a high-resolution RGB camera and the depth sensor includes a low resolution time of flight sensor.

Example 36 includes the subject matter of any one of examples 30-35, where the posture detection engine is further to generate feedback data for presentation to the user, where the feedback data identifies whether the posture of the user is correct or incorrect.

Example 37 includes the subject matter of any one of examples 30-36, where dimensions of the first features set are lower than dimensions of the image data.

Example 38 includes the subject matter of any one of examples 30-37, where the posture detection engine is further to: provide a first version of the image data to a person detection model to detect that a view of the user occupies a subarea of the image data; and generate a cropped version of the image data, where the cropped version of the image data includes the subarea, where the cropped version of the image data is provided as an input to the first machine learning model.

Example 39 includes the subject matter of example 38, where the posture detection engine is further to: determine a subset of depth pixels of the depth data corresponding to the subarea; and crop the depth data to generate a cropped version of the depth data to include the subset of depth pixels, where the cropped version of the depth data is provided as the second input to the second machine learning model.

Example 40 includes the subject matter of any one of examples 30-39, where the first machine learning model includes a convolutional neural network.

Example 41 includes the subject matter of any one of examples 30-40, where the first feature set and the second feature set each define a set of features associated with whether a body part of the user is angled toward or away from the user computing device.

Example 42 includes the subject matter of example 41, where the set of features in the second feature set are more accurate than the set of features in the first feature set.

Example 43 includes the subject matter of example 42, where the body part includes a torso of a user.

Example 44 includes the subject matter of example 42, where the body part includes a limb of a user.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A non-transitory machine-readable storage medium with instructions stored thereon, the instructions executable by the machine to cause the machine to:

receive image data generated by a camera with a first resolution, wherein the camera is provided on a user computing device to capture an image of a user of the user computing device;

execute a first machine learning model trained to determine a feature set associated with posture of the user from the image data;

receive depth data generated by a time of flight (ToF) sensor provided on the user computing device, wherein the depth data has a second resolution lower than the first resolution and is generated contemporaneously with generation of the image data;

provide the first feature set as a first input and the depth data as a second input to a second machine learning model to generate a second feature set as an output of the second machine learning model; and determine a posture of the user from the second feature set.

2. The storage medium of claim 1, wherein the image data comprises two-dimensional red-green-blue (RGB) image data.

3. The storage medium of claim 1, wherein dimensions of the first features set are lower than dimensions of the image data.

4. The storage medium of claim 1, wherein the instructions are further executable to cause the machine to:

provide a first version of the image data to a person detection model to detect that a view of the user occupies a subarea of the image data;

generate a cropped version of the image data, wherein the cropped version of the image data comprises the subarea, wherein the cropped version of the image data is provided as an input to the first machine learning model.

5. The storage medium of claim 4, wherein the instructions are further executable to cause the machine to:

determine a subset of depth pixels of the depth data corresponding to the subarea;

crop the depth data to generate a cropped version of the depth data to comprise the subset of depth pixels, wherein the cropped version of the depth data is provided as the second input to the second machine learning model.

6. The storage medium of claim 1, wherein the first machine learning model comprises a convolutional neural network.

7. The storage medium of claim 1, wherein the first feature set and the second feature set each define a set of features associated with whether a body part of the user is angled toward or away from the user computing device.

8. The storage medium of claim 7, wherein the set of features in the second feature set are more accurate than the set of features in the first feature set.

9. The storage medium of claim 8, wherein the body part comprises a torso of a user.

10. The storage medium of claim 8, wherein the body part comprises a limb of a user.

11. The storage medium of claim 1, wherein the camera comprises a webcam integrated into the user computing device and the ToF sensor comprises a low-resolution ToF sensor integrated into the user computing device.

12. The storage medium of claim 1, wherein the user computing device comprises one of a laptop computer, a desktop computer, a smart television, or a gaming system.

13. A method comprising:

receiving two-dimensional image data generated by a camera of a user computing device, wherein the image data comprises an image of a user using the user computing device;

applying a first machine learning model to the image data to generate a first feature set, wherein the first feature set identifies features of a pose of the user from the image data;

receiving depth data generated by a depth sensor of the user computing device, wherein the depth data comprises a grid of depth pixels and is generated contemporaneously with the image data;

providing the first feature set as a first input and the depth data as a second input to a second machine learning model to generate a second feature set as an output of the second model; and determining a posture of the user from the second feature set.

14. The method of claim 13, further comprising determining whether the posture of the user is correct or incorrect based on the second feature set.

15. The method of claim 14, further comprising generating feedback data for presentation to the user, wherein the feedback data identifies whether the posture of the user is correct or incorrect.

16. An apparatus comprising:

a processor;

a memory;

a display;

a camera sensor oriented to face a human viewer of the display;

a depth sensor oriented to face the human viewer of the display;

a posture detection engine executable by the processor to:

receive two-dimensional image data generated by the camera, wherein the image data comprises an image of the human viewer;

provide the image data as an input to a first machine learning model to determine a first feature set, wherein the first machine learning model is trained to determine a post of a human from two-dimensional images;

receive depth data generated by the depth sensor contemporaneously with generation of the image data, wherein the depth data comprises one or more depth measurements of the human viewer;

provide the first feature set as a first input and the depth data as a second input to a second machine learning model to generate a second feature set as an output of the second machine learning model;

determine a posture of the human viewer from the second feature set; and determine quality of the posture of the human viewer based on the second feature set.

17. The apparatus of claim 16, further comprising a central processing unit (CPU), wherein the processor is separate from the CPU, and logic implementing primary functionality of a user computing device is executed using the CPU.

18. The apparatus of claim 16, wherein the apparatus comprises a user computing device, and the user computing device comprises the processor, the display, the camera, the depth sensor, and the posture detection engine.

19. The apparatus of claim 18, wherein the user computing device comprises one of a laptop computer, a desktop computer, a tablet computer, a smart television, or a video gaming system.

20. The apparatus of claim 16, wherein the camera and the depth sensor are embedded in a bezel, wherein the bezel at least partially frames the display.

21. The apparatus of claim 16, wherein the camera comprises a high-resolution RGB camera and the depth sensor comprises a low resolution time of flight sensor.

* * * * *